(12) United States Patent
Kitoh et al.

(10) Patent No.: US 6,258,487 B1
(45) Date of Patent: *Jul. 10, 2001

(54) LITHIUM SECONDARY BATTERY INCLUDING A DIVIDED ELECTRODE BASE LAYER

(75) Inventors: Kenshin Kitoh, Nagoya; Teruhisa Kurokawa, Ana-gun, both of (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,648

(22) Filed: Oct. 9, 1998

(30) Foreign Application Priority Data

Oct. 14, 1997 (JP) .................................. 9-280811

(51) Int. Cl.⁷ .............................. H01M 4/64; H01M 4/74
(52) U.S. Cl. .................. 429/233; 429/231.8; 429/233; 429/246
(58) Field of Search .................... 429/231.8, 233, 429/238, 246

(56) References Cited

U.S. PATENT DOCUMENTS 5,525,441  6/1996  Reddy et al. .

FOREIGN PATENT DOCUMENTS

| 0 397 457 | 11/1990 | (EP) . |
| 0 771 040 | 5/1997 | (EP) . |
| 0 814 525 | 12/1997 | (EP) . |
| 60-175378 | 9/1985 | (JP) . |
| 4-104478 | 4/1992 | (JP) . |
| 6-260172 | 9/1994 | (JP) . |
| 8-185885 | 7/1996 | (JP) . |

OTHER PUBLICATIONS

Patent Abstracts of Japan, vol. 096, No. 11, Nov. 29, 1996 & JP 08 185885 A (Yuasa Corp), Jul. 16, 1996.
Patent Abstracts of Japan, vol. 016, No. 344 (E–1239), Jul. 24, 1992 & JP 04 104478A (Touyou Takasago Kandenchi KK; Others: 01), Apr. 6, 1992.
Patent Abstracts of Japan, vol. 018, No. 658 (E–1643), Dec. 13, 1994 & JP 06 260172 A (Japan Storage Battery Co Ltd), Sep. 16, 1994.
Patent Abstracts of Japan, vol. 010, No. 11 (E–374), Jan. 17, 1986 & JP 60 175378 A (Hitachi Maxell KK), Sep. 9, 1985.
Patent Abstracts of Japan, vol. 012, No. 393 (E–670), Oct. 19, 1988 & JP 63 133455 A (Shin Kobe Electric Mach Co Ltd), Jun. 6, 1988.

*Primary Examiner*—Carol Chaney
*Assistant Examiner*—Mark Ruthkosky
(74) *Attorney, Agent, or Firm*—Burr & Brown

(57) ABSTRACT

A lithium secondary battery includes: a battery case, and an internal electrode body 1 contained in the battery case and including a positive electrode 2, a negative electrode 3, and a separator 4 made of porous polymer. The positive electrode and the negative electrode are wound through the separator so that the positive electrode and the negative electrode are not brought into contact with each other. At least one of the positive electrode 2 and negative electrode 3 has two or more divided electrodes. The lithium secondary battery is excellent in the charging/discharging cycle characteristics, has high reliability, and is used particularly as a battery for driving a motor of an electric vehicle.

26 Claims, 4 Drawing Sheets

Winding Direction

LITHIUM SECONDARY BATTERY INCLUDING A DIVIDED ELECTRODE BASE LAYER

BACKGROUND OF THE INVENTION AND RELATED ART STATEMENT

The present invention relates to a lithium secondary battery which is excellent in the charging discharging cycle characteristics, and has high reliability, and is suitably used particularly as a battery for driving a motor of an electric vehicle.

In recent years, the lithium secondary battery is being rapidly and widely used to realize a small power source for portable electronic equipment. In addition, effort of development is being also made to realize practical use of the lithium secondary battery as a motor driving battery for an electric vehicle which replaces a gasoline-powered vehicle, and as a battery for storing electric power in the night.

In the lithium secondary battery, a lithium transition metal compound oxide such as lithium-cobalt oxide ($LiCoO_2$), lithium-nickel oxide ($LiNiO_2$), or lithiummanganese oxide ($LiMn_2O_4$) is used as a positive active material, while various carbon materials are used as a negative active material. At charging, lithium ions in the positive active material are transferred to the negative active material. Contrariwise, at discharging, lithium ions captured by the negative electrode are transferred to the positive electrode. Thus, charging and discharging are performed.

The structure of lithium secondary battery is roughly divided into a wound type and a laminated type. Of them, the wound type is constituted by inserting an internal electrode body 1, which is formed by winding a positive electrode 2 and a negative electrode 3, as shown in FIG. 4, through a separator 4, into a tubular container, and suitable for producing a compact battery while using electrodes with large area. In the case of this wound type, since it is sufficient that there is at least one lead for current collection 5 from each electrode 2, 3, and, even if it is desired to lower electricity collection resistance of each electrode 2, 3, it is sufficient to increase the number of leads, there is an advantage that the internal structure of battery does not become complicated to make easy assembly of the battery.

Here, noting the charging/discharging mechanism again, when the lithium ions are transferred from the positive electrode to the negative electrode at charging, $LiCoO_2$ or the like as the positive active material causes cubical expansion as the lithium ions are desorbed. On the other hand, the negative active material is expanded as it captures the lithium ions desorbed from the positive active material. For example, if graphite is used as the negative active material, it is confirmed that spacing is separated as lithium ions are intercalated between atomic layers of graphite. Therefore, in the lithium secondary battery, both the positive and negative electrodes would expand at charging.

On the contrary, at discharge where the lithium ions are transferred from the negative electrode to the positive electrode, both the positive and negative electrodes would contract. It has been found that such expansion/contraction of electrodes is more significant in the negative electrode than the positive electrode. Moreover, it has been found that the charging/discharging electrode shows a larger change in its volume when the same carbon material with a high degree of graphitization is used as the negative active material. Therefore, although it is particularly desirable to use a material with a low degree of graphitization to suppress volume change of the negative electrode, a material with a higher degree of graphitization is preferable to reduce the size of battery and to improve volume and weight energy density since it has higher specific gravity, and a ratio of lithium ions contributing to charging/discharging which can be retained per unit weight is high (smaller amount of dead lithium).

In the wound-type internal electrode body, substantially constant static pressure (tightening pressure) is applied to each electrode since each electrode is wound under a substantially equal force when it is produced. However, as described above, since a volume change of expansion/contraction occurs in each electrode at charge/discharge, repetition stress would be caused in both the positive and negative electrodes and the separator in the winding direction. As this stress breaks the tightening pressure on the internal electrode body, there may arise peeling of the electrode active material, partial bending or generation of cracks in the electrode, and cyclic degradation of compressing/breakdown of the separator. Moreover, this degradation may cause internal pressure rise caused by local heating and evaporation of electrolyte from partial concentration of current and/or abnormal discharge caused by internal short-circuiting. This stress will be larger if the winding length of the electrodes is longer.

Such cyclic degradation is undesirable for the battery characteristics regardless of its application. However, the cyclic degradation particularly tends to occur in a battery with a large capacity of 50 Wh or more which is required for a battery for an electric vehicle (EV) or a hybrid electric vehicle (HEV) since such a battery has a total length of several meters for the positive and negative electrodes in the winding direction. Such cyclic degradation leads to lowering a of running performance. In addition, there is a possibility that an accident involving the battery caused by abnormal current generated from the cyclic degradation would lead to an unfathomable severe accident compared with a small battery.

SUMMARY OF THE INVENTION

The present invention has been made in view of the above-mentioned problems in the prior art, and is intended to provide a lithium secondary battery having a wound-type internal electrode body for which the cyclic degradation is suppressed, and which has excellent durability and reliability.

That is, according to the present invention, there is provided a lithium secondary battery comprising: a battery case, and an internal electrode body contained in the battery case and including a positive electrode, a negative electrode, and a separator made of porous polymer, the positive electrode and the negative electrode being wound through the separator so that the positive electrode and the negative electrode are not brought into direct contact with each other;

wherein at least one of said positive and negative electrodes has two or more divided electrodes.

In the lithium secondary battery of the present invention, the divided electrode is mounted with at least one lead for current collection. Moreover, it is preferable that the length of divided electrode in the winding direction is made equal to or more than the outer peripheral length of the internal electrode body being produced, but equal to or less than one-half the total length of the positive or negative electrode.

In addition, according to the present invention, there is provided a lithium secondary battery comprising:

a battery case, and an internal electrode body contained in the battery case and including a positive electrode, a negative electrode, and a separator made of porous polymer, the positive electrode and the negative electrode being wound through the separator so that the positive electrode and the negative electrode are not brought into direct contact with each other;

wherein at least one of the positive or negative electrode is provided with a slit.

That is, in the case where such a slit is provided, even when the internal electrode body is formed by using each one of the positive and negative electrodes, it is possible to reduce stress generated in each electrode at charge/discharge as in the case where the divided electrode is used. Therefore, it may be possible to simultaneously employ use of the divided electrode and the formation of a slit. In the lithium secondary battery of the present invention described above, it is most effective to use graphite or a high graphitized carbon material as the negative active material applied on the negative electrode.

As described above, the lithium secondary battery of the present invention reduces stress generated in the electrode within the battery due to charging/discharging of the battery, thereby suppressing cyclic degradation and improving reliability.

DETAILED DESCRIPTION OF THE PREFERRED EMBODIMENT

Now, embodiments of the present invention will be described, but the present invention is not limited to these embodiments.

Figure 4:
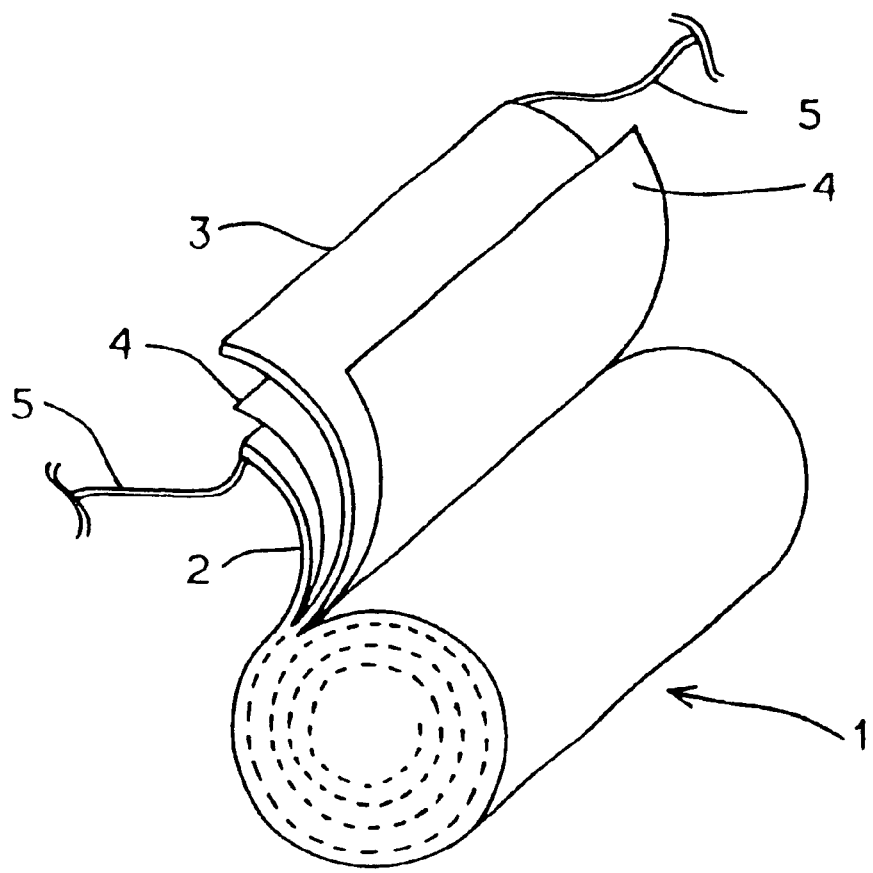
FIG. 4 is a perspective view showing a structure of a wound-type internal electrode body.

In the lithium secondary battery of the present invention, an internal electrode body is composed by winding positive and negative electrodes through separator films of porous polymer such that the positive electrodes do not directly contact the negative electrodes. Specifically, it includes a structure shown in FIG. 4, that is, internal electrode body 1.

Here, materials suitable for use as the positive electrode include an aluminum foil coated with $LiCoO_2$, $LiNiO_2$ or $LiMn_2O_4$ which is a positive active material mixed with carbon powder for improving conductivity. In addition, the carbon powder may include acetylene black, graphite powder or the like. In this regard, the aluminum foil constituting the positive electrode preferably uses material with high purity to prevent the battery performance from lowering due to corrosion by an electrochemical reaction of the battery.

On the other hand, suitably used as the negative electrode is a copper foil on which an amorphous carbon material such as soft carbon or hard carbon, or carbon powder such as graphite such as natural or artificial graphite or highly graphitized carbon material as the negative active material is applied. In the present invention, use of graphite or a highly graphitized carbon material allows it to significantly exhibit an effect to reduce stress generated in the internal electrode body. In addition, these materials are advantageous in improving volume and weight energy density of the battery because they have a higher specific density and a higher ratio of lithium ions contributing to charging/discharging which can be retained per unit weight when compared to a less graphitized material. Here, similarly to the aluminum foil used for the positive electrode, it is preferable to use a high purity material for the copper foil used as the negative electrode to withstand the corrosion due to an electrochemical reaction.

As a material of the separator film, it is preferable to use a three-layer structural material in which a polyethylene film having lithium ion permeability and including micropores is sandwiched between porous polypropylene films having lithium ion permeability. This serves also as a safety mechanism in which when the temperature of the internal electrode body is raised, the polyethylene film is softened at about 130° C. so that the micropores are collapsed to suppress the movement of lithium ions, that is, the battery reaction. When the polyethylene film is sandwiched between the polypropylene films having a softening temperature higher than the polyethylene film, it is possible to prevent the contact between the positive and negative electrodes even after the softening of polyethylene.

Then, an internal electrode body is formed by winding the positive and negative electrodes through a separator film such that they do not contact each other. Here, in the present invention, at least one of the positive or negative electrode is constituted by two or more electrodes. That is, while each one of positive and negative electrodes is conventionally wound, in the present invention, the internal electrode body is constituted by an electrode which is at least one of the electrodes divided into several electrodes without changing the total length of electrode (hereinafter called a "divided electrode"). When the electrode is divided as described above, it relaxes stress caused by expansion/contraction of positive and negative electrodes in charging/discharging the battery, thereby improving the cycle characteristics.

In the case where the divided electrode is used for the positive electrode, it is preferable that the divided electrodes do not overlap each other at the joint of them in forming the internal electrode body. This is because, if the divided electrodes overlap, weight of the positive active material increases at the overlapped area, and causes a possibility where lithium ions in an amount exceeding an amount which the negative active material can retain are supplied to the opposite negative electrode at charge, whereby lithium dendrite growth may increase the possibility of internal short-circuiting or cyclic degradation.

However, if the divided electrodes are separated too much, there arises a problem in that the static pressure in the laminating direction (direction perpendicular to the plane of each electrode) in winding each of the positive and negative electrodes cannot be maintained at the gap, that is, the shape is unstabilized. There also arises a problem in that there is an increase of the portion which cannot function as the battery such that the negative electrode opposite to the gap fails to function, or there is provided a useless space where the positive electrode does not exist although there is an opposing negative electrode. Therefore, it is preferable to make the gap between respective divided electrodes as narrow as possible.

On the other hand, in the case where the divided electrode is used as the negative electrode, opposite to the case of the positive electrode, it is necessary that there is no gap between respective divided electrodes. If there is such gap, lithium ions supplied from the positive electrode opposite to the gap concentrate at the end of the negative divided electrode to cause current concentration, which supplies lithium ions exceeding an amount which can be retained to the end of divided electrode. Thus, it causes a phenomenon similar to a case where the divided electrodes overlap in the positive electrode. Therefore, if the negative divided electrodes overlap each other at the joint, it is possible to surely avoid such a phenomenon. However, if such an overlap area is too large, one divided electrode at the overlapped portion becomes substantially not unable to function as a battery, so that overlapping of negative divided electrodes is preferably to be as small as possible.

Figure 1:
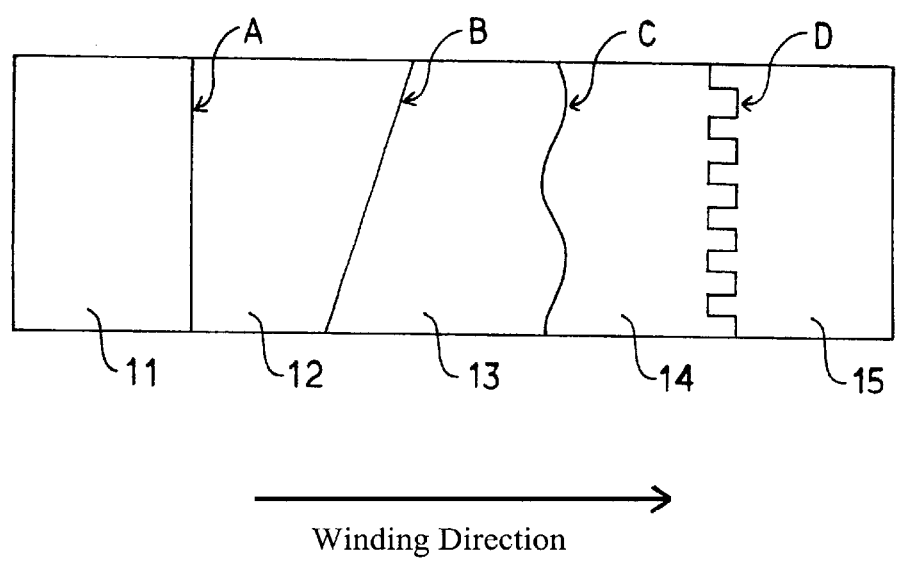
FIG. 1 is a plan view showing an example of shape of a divided section for an electrode in the present invention.

Here, the shape of the joint between respective divided electrodes, in other words, the shape of division when one electrode is divided to form the of divided electrodes is not necessarily linear, and not necessarily perpendicular to the winding direction. For example, as shown in FIG. 1, of the shape of joint between the divided electrodes 11–15 may be a straight line (A), an oblique line (B), a wavy line (C) or a comb-shape (D) to divide the length in the winding direction.

Then, when the electrode is constituted by a plurality of divided electrodes, it is preferable to mount at least one lead on each divided electrode of the positive and/or negative electrodes as a means for collecting current from each divided electrode.

In particular when the positive electrode is constituted by the divided electrodes, since each divided electrode contacts each other on its side or forms a minute gap to arrange a wound body, as described above, a flow of current is prevented in the winding direction between respective divided electrodes. Therefore, it is preferable to provide the lead for each divided electrode, and to form a current path to an external terminal by connecting leads to the internal terminal.

On the other hand, when the negative electrode is constituted by the divided electrodes, since each divided electrode is wound to overlap each other, as described above, and a flow of current is assured in the winding direction by the overlapped portion, it is not necessary to provide the collector tab for each divided electrode. However, since conduction between the divided electrodes is assured only by contact, it is of concern that contact resistance or internal resistance may become high. Therefore, even for the negative electrode, it is preferable to provide a lead for each divided electrode from the viewpoint of reducing the collection resistance.

However, as illustrated by examples described later, the position where the lead is mounted may not be same for all divided electrodes. It may be arranged such that each lead is positioned on the same radius vector on the end circle of the internal electrode body after winding, and that distance between adjacent leads does not exceed the outer peripheral length of the internal electrode body when the internal electrode body is developed on a plane by taking collection efficiency into account. This is to conveniently produce a battery with low internal resistance without making the internal structure of the battery unnecessarily complicated, and to avoid increasing the manufacturing cost or lowering the weight energy density of the battery due to the provision of unnecessary leads.

Therefore, there may be a case where the internal electrode body with no lead is used depending on the setting of length of the divided electrode in the winding direction. Thus, such length of the divided electrode in the winding direction is preferably arranged to be equal to or more than the outer peripheral length of the internal electrode body being produced, but equal to or less than one-half the total length of the divided electrode. Setting these conditions, it becomes possible to avoid inconvenience such that the number of leads per divided electrode becomes small to increase the internal resistance of the internal electrode body in the winding direction even if the length of divided electrode is short in the winding direction, or to avoid lowering of the stress reduction effect in the case of a too long divided electrode.

Then, by further optimizing the conditions for setting the divided electrode, it is possible to make more effective the effect to relax the stress generated in the internal electrode body due to the expansion/contraction of electrodes as the battery is charged and discharged, and to maintain the characteristics of the battery.

Furthermore, according to the present invention, whether or not the positive and/or negative electrodes are constituted by the divided electrodes, the stress relaxing effect as in the above where the divided electrode is used can be attained by providing a slit in at least one electrode. It may be allowed to use the divided electrode, and also to provide the slit.

An example of formation of such a slit is a case where an electrode is not completely divided but partially divided by a slit in a shape similar to various joints for the divided electrode shown in FIG. 1 to constitute one electrode as a whole. In this case, such a slit may be whether it is formed from the side of electrode parallel to the winding direction of electrode toward the inside of the electrode, or formed only in the electrode and not reaching side of the electrode parallel to the winding direction of electrode.

However, if too many slits are formed, a flow of current is prevented in each electrode in the winding direction thereby raising the internal resistance, so that the number of slits formed is preferably to be equal to the number of divisions in using the divided electrode as described above. In addition, the stress can be evenly relaxed in the winding direction by not concentrating such slits at one location of the electrode, but evenly forming then over the entire electrode.

As described above, the stress generated in the internal electrode body due to expansion/contraction of the electrodes as the battery is charged and discharged can be reduced by using the divided electrode and/or forming the slit. Since the expansion/contraction of the electrode is particularly significant in a negative electrode on which graphite or highly graphitized carbon material is applied as the negative active material, the features of arrangement of the above electrodes according to the present invention are particularly effective when the negative electrode is formed by applying graphite or highly graphitized carbon material as the negative active material. Thus, the volume and weight energy density of the battery can be improved by using a graphite material which has a high specific gravity, and a large capacity for retaining lithium ions contributing to charge/discharge.

Now, an example of a lithium secondary battery according to the present invention is described, but it is needless to say that the present invention is not limited to the example.

EXAMPLE

A positive electrode of length in winding length 3400 mm×width 200 mm as the shape of electrode surface was formed of an aluminum foil coated with a mixture in which carbon powder (acetylene black) for improving the conductivity was added to and mixed in lithium-cobalt oxide ($LiCoO_2$) as a positive active material. The negative electrode of length in winding direction 3600 mm×width 200 mm was formed by applying graphite powder on a copper foil. The positive electrode thus formed was divided into two to have the length of each piece in the winding direction of 1700 mm, while the negative electrode was divided into three to have the length of each piece in the winding direction of 1200 mm. Then, the internal electrode body was formed by insulating and winding the positive and negative electrodes using a microporous separator of polypropylene. In this case, the division of each electrode was linearly performed in a direction perpendicular to the winding direction. In addition, in the positive and negative electrodes, the divided electrodes were not wound to overlap, but came into contact only on the divided side.

Then, the formed internal electrode body was inserted into a cylindrical battery case. Electrolyte which was prepared by dissolving an $LiPF_6$ electrolyte in a mixed solution of ethylene carbonate (EC) and diethyl carbonate (DEC) was poured into the battery case after one end was sealed by a sealing structure shown in FIG. 2. And then the other end was also sealed with the sealing structure shown in FIG. 2.

Figure 2:
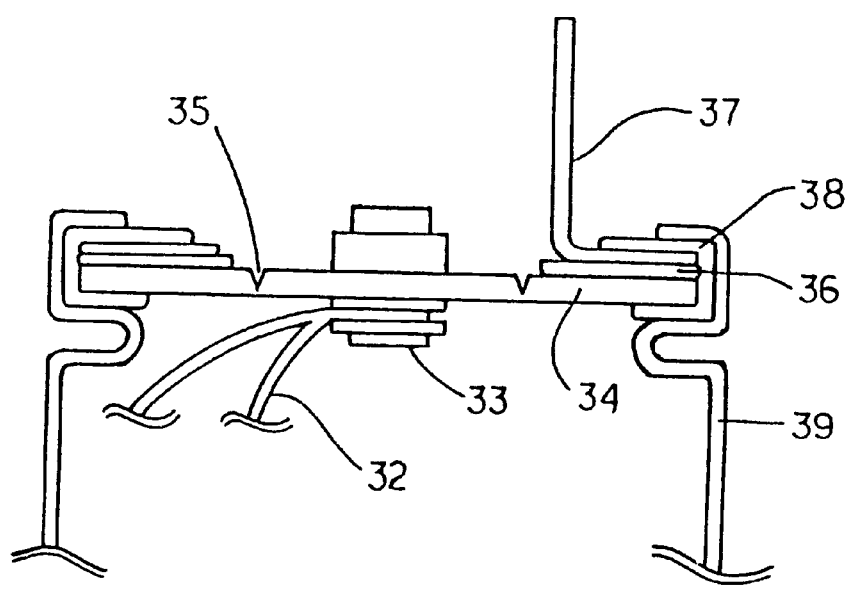
FIG. 2 is a sectional view showing a structure at the end of a lithium secondary battery produced according to an embodiment.

In FIG. 2, a lead 32 for electricity collection connected to either the positive or negative electrode (not shown) was connected to a metal rivet 33 as the internal terminal mounted on a disk 34 for sealing the battery case 39. Then, the disk 34 was provided with a pressure release valve 35 which would burst at a predetermined pressure, and crimped onto the battery case 39 through ethylene propylene rubber 38 so that an external terminal 37 was electrically connected to the disk 34 through a metal ring 36, and do that the disk 34, the metal ring 36 and the external terminal 37 were electrically insulated from the battery case 39. Thus, there was formed a battery of cylindrical type with both terminals in which the external terminal for either the positive or negative electrode was disposed on one end of the battery case 39. Here, the battery case 39 was an aluminum cylinder of outer diameter 50 mm, wall thickness 1 mm, and length 245 mm, and the disk 34 for the positive electrode was also made of aluminum and for the negative electrode made of copper.

In this case, electricity was collected from each of the positive and negative electrodes through leads welded on the leads provided on the positive and negative electrodes. The leads were provided to be separately formed on each end surface of the internal electrode body to attain the battery structure described above. Then, the leads were arranged such that distance between adjacent leads was about 100 mm not to exceed the circumferential length of battery when each electrode was developed on a plane, and on the same radius vector on the end circle when they were wound.

COMPARATIVE EXAMPLE

Then, as a comparative example, an internal electrode body was formed in a similar manner to the example by producing a positive electrode with the electrode surface shape of length in the winding direction 3400 mm×width 200 mm, and a negative electrode of length in winding direction 3600 mm×width 200, but not dividing them to obtain a battery with the same structure as the example. Therefore, the example and the comparative example have the same total length for the positive and negative electrodes in the winding direction, that is, the area of electrode, and differ only in whether or not each electrode is divided.

(Test Results)

Figure 3:
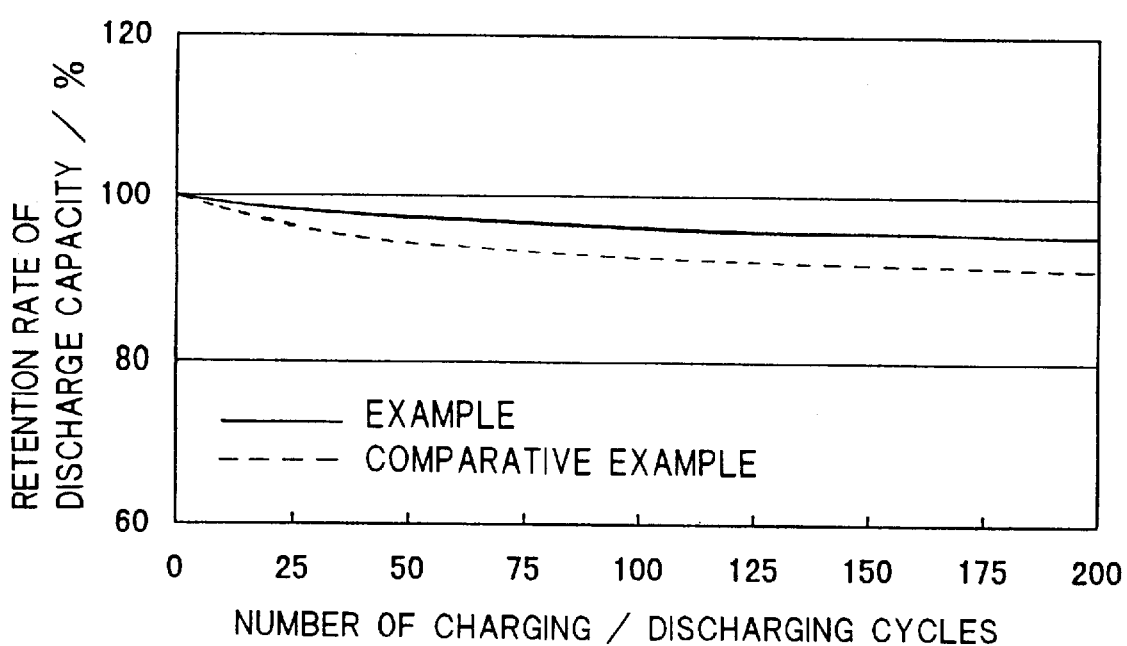
FIG. 3 is a graph showing charge/discharge cycle characteristics of an example and a comparative example.

The batteries of the example and the comparative example formed as above had an initial battery capacity of 30 Ah. Change of discharge capacity was measured by repeating a cycle to charge them at a constant current of 10 A and a constant voltage of 4.1 V (total charging time of 6 hours) and to discharge them at 6 A to 2.5 V (discharging rate of 0.2 C, and discharging all capacity in 5 hours). FIG. 3 is a graph showing the relationship between the retention rate of discharge capacity and the number of charging/discharging cycles.

It is found that the example shows a smaller reduction of capacity after 200 cycles. Then, the internal resistance of batteries was measured after 200 cycles, and compared with the initial internal resistance, which revealed that the example had a smaller increase of internal resistance. Moreover, when each battery after 200 cycles was disassembled and observed on the inside, wrinkling assumed to be generated on the negative electrode was observed on the comparative example, but no such wrinkling was observed on the example of the invention. Therefore, it is believed that the increase of internal resistance was small because the stress caused by expansion/contraction of each electrode at charge/discharge was relaxed by dividing the electrodes in the example, so that the tightening pressure in the battery was maintained at a constant level.

As described, according to the lithium secondary battery of the present invention, since the electrode is divided in the winding direction, it is relaxed for the stress generated by expansion/contraction of the electrode according to charging/discharging, so that a battery with small reduction of capacity according to the charging/discharging cycle can be obtained. In addition, since it is possible to use a graphite negative active material having high specific gravity and a large capacity for retaining lithium ions contributing to charge/discharge per unit weight, the volume and weight energy density can be improved for the battery. Moreover, it has a very excellent advantage in that it is excellent in safety because generation of wrinkling which is generated in the battery with the conventional structure, and, therefore, any accident such as internal short-circuiting due to such wrinkling can be avoided.

What is claimed is:

1. A lithium secondary battery comprising:
   an internal electrode body contained in the battery case and including a positive electrode, a negative electrode, and a separator made of porous polymer, the positive electrode and the negative electrode being wound through the separator in a winding direction so that the positive electrode and the negative electrode are not brought into direct contact with each other;
   wherein at least one of said positive and negative electrodes is a divided electrode, said divided electrode comprising at least two separate distinct base layers, each of said at least two base layers having electrode material coated thereon; and
   wherein, when said divided electrode is a positive electrode, said at least two separate base layers are separated from each other in a lengthwise direction by a gap sufficient to prevent a flow of current between said at least two separate base layers, and when said divided electrode is a negative electrode, said at least two separate base layers are touching so no gap exists between them.

2. A lithium secondary battery according to claim 1, wherein at least one lead for current collection is mounted on said divided electrode.

3. A lithium secondary battery comprising:
   an internal electrode body contained in the battery case and including a positive electrode, a negative electrode, and a separator made of porous polymer, the positive electrode and the negative electrode being wound through the separator in a winding direction so that the positive electrode and the negative electrode are not brought into direct contact with each other;

wherein at least one of said positive and negative electrodes is a divided electrode, said divided electrode comprising at least two separate distinct base layers, each of said at least two base layers having electrode material coated thereon; and wherein the length of said divided electrode in the winding direction is made equal to or more than the outer peripheral length of the internal electrode body being produced, but equal to or less than one-half the total length of said positive or negative electrode.

4. A lithium secondary battery comprising:

a battery case; and an internal electrode body contained in the battery case and including a positive electrode, a negative electrode, and a separator made of porous polymer, the positive electrode and the negative electrode being wound through the separator so that the positive electrode and the negative electrode are not brought into direct contact with each other;

wherein at least one of said positive and negative electrodes is a divided electrode, said divided electrode comprising at least two separate and distinct base layers, each of said at least two base layers having electrode material coated thereon.

5. A lithium secondary battery comprising:

an internal electrode body contained in the battery case and including a positive electrode, a negative electrode, and a separator made of porous polymer, the positive electrode and the negative electrode being wound through the separator so that the positive electrode and the negative electrode are not brought into direct contact with each other;

wherein at least one of said positive and negative electrodes is a divided electrode, said divided electrode comprising at least two separate base layers, each of said at least two base layers having electrode material coated thereon; and wherein a negative active material applied on said negative electrode is graphite or highly graphitized carbon material.

6. A lithium secondary battery according to claim 4, wherein a negative active material applied on said negative electrode is graphite or highly graphitized carbon material.

7. A lithium secondary battery according to claim 1, wherein said at least two separate base layers are divided by a line substantially perpendicular to said winding direction.

8. A lithium secondary battery according to claim 1, wherein said at least two separate base layers are divided by one of an oblique line, a wavy line, and a comb-shaped line.

9. A lithium secondary battery according to claim 2, wherein each separate base layer has its own lead mounted thereon.

10. A lithium secondary battery according to claim 4, wherein said slit crosses an edge of said at least one of said positive or negative electrode provided with said slit wherein said edge runs parallel to said winding direction and said slit is one of a straight line, an oblique line, a wavy line, and a comb-shaped line.

11. A lithium secondary battery according to claim 4, wherein said slit is entirely within said at least one of said positive or negative electrode and said slit is one of a straight line, an oblique line, a wavy line, and a comb-shaped line.

12. A lithium secondary battery as recited in claim 1, wherein said divided electrode comprises at least first and second positive electrode parts, said first positive electrode part comprising a first of said at least two separate base layers and at least one layer of said electrode material, said second positive electrode part comprising a second of said at least two separate base layers and at least one layer of said electrode material, said first positive electrode and said second positive electrode part being spaced from each other by a positive electrode gap, said gap preventing a flow of current between said first positive electrode part and said second positive electrode part.

13. The lithium secondary battery as recited in claim 12, wherein said first positive electrode part, said second positive electrode part and said negative electrode each have at least one lead for current collection.

14. The lithium secondary battery as recited in claim 12, wherein said gap is substantially perpendicular to said winding direction.

15. The lithium secondary battery as recited in claim 12, wherein said gap is substantially oblique, wavy or comb-shaped.

16. A lithium secondary battery as recited in claim 1, wherein said divided electrode comprises at least first and second negative electrode parts, said first negative electrode part comprising a first of said at least two separate base layers and at least one layer of said electrode material, said second negative electrode part comprising a second of said at least two separate base layers and at least one layer of said electrode material, said first negative electrode and said second negative electrode being in contact with each other, whereby said first and second negative electrodes are free to move relative to one another.

17. The lithium secondary battery as recited in claim 16, wherein said positive electrode, said first negative electrode part and second negative electrode part each have at least one lead for current collection.

18. The lithium secondary battery as recited in claim 16, wherein an area in which said first negative electrode part is in contact with said second negative electrode part is substantially perpendicular to said winding direction.

19. The lithium secondary battery as recited in claim 16, wherein an area in which said first negative electrode part is in contact with said second negative electrode part is substantially oblique, wavy or comb-shaped.

20. A lithium secondary battery as recited in claim 3, wherein said divided electrode comprises at least first and second positive electrode parts, said first positive electrode part comprising a first of said at least two separate base layers and at least one layer of said electrode material, said second positive electrode part comprising a second of said at least two separate base layers and at least one layer of said electrode material, said internal electrode body having a total internal positive electrode body length equal to a combined sum of each of the lengths, in said winding direction, of each said positive electrode part in said internal electrode, said internal electrode body having an outer peripheral length, said first positive electrode part having a first positive electrode part length in said winding direction which is greater than or equal to said outer peripheral length of said internal electrode body and less than or equal to one-half of said total internal positive electrode body length, said second positive electrode part having a second positive electrode length in said winding direction which is greater than or equal to said outer peripheral length of said internal electrode body and less than or equal to one-half of said total internal positive electrode body length.

21. A lithium secondary battery as recited in claim 3, wherein said divided electrode comprises at least first and second negative electrode parts, said first negative electrode part comprising a first of said at least two separate base layers and at least one layer of said electrode material, said second negative electrode part comprising a second of said at least two separate base layers and at least one layer of said electrode material, said internal electrode body having a total internal negative electrode body length equal to a combined sum of each of the lengths, in said winding direction, of each said negative electrode part in said internal electrode, said internal electrode body having an outer peripheral length, said first negative electrode part having a first negative electrode part length in said winding direction which is greater than or equal to said outer peripheral length of said internal electrode body and less than or equal to one-half of said total internal negative electrode body length, said second negative electrode part having a second negative electrode length in said winding direction which is greater than or equal to said outer peripheral length of said internal electrode body and less than or equal to one-half of said total internal negative electrode body length.

22. A lithium secondary battery as recited in claim 4, wherein said at least one electrode having a slit formed in the corresponding base layer and electrode material is said positive electrode.

23. A lithium secondary battery as recited in claim 4, wherein said at least one electrode having a slit formed in the corresponding base layer and electrode material is said negative electrode.

24. The lithium secondary battery as recited in claim 23, wherein sad negative electrode material comprises graphite or highly graphitized carbon material.

25. A lithium secondary battery as recited in claim 5, wherein said divided electrode comprises at least first and second positive electrode parts, said first positive electrode part comprising a first of said at least two separate base layers and at least one layer of said electrode material, said second positive electrode part comprising a second of said at least two separate base layers and at least one layer of said electrode material, said negative electrode comprising a negative electrode base layer and at least one negative active material layer comprising graphite or highly graphitized carbon material.

26. A lithium secondary battery as recited in claim 5, wherein said divided electrode comprises at least first and second negative electrode parts, said first negative electrode part comprising a first of said at least two separate base layers and at least one layer of said electrode material comprising graphite or highly graphitized carbon material, said second negative electrode part comprising a second of said at least two separate base layers and at least one layer of said electrode material comprising graphite or highly graphitized carbon material.

* * * * *